(12) United States Patent
Xu et al.

(10) Patent No.: US 10,455,781 B2
(45) Date of Patent: Oct. 29, 2019

(54) METHOD FOR CONTROLLING SURFACE IRRIGATION BASED ON SURFACE WATER DEPTH INFORMATION

(71) Applicant: China Institute of Water Resources and Hydropower Research, Beijing (CN)

(72) Inventors: Di Xu, Beijing (CN); Caili Wu, Beijing (CN); Meijian Bai, Beijing (CN); Yinong Li, Beijing (CN); Fuxiang Li, Beijing (CN); Yuan Shi, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 0 days.

(21) Appl. No.: 15/544,130

(22) PCT Filed: Mar. 22, 2016

(86) PCT No.: PCT/CN2016/076969
§ 371 (c)(1),
(2) Date: Jul. 17, 2017

(87) PCT Pub. No.: WO2017/088328
PCT Pub. Date: Jun. 1, 2017

(65) Prior Publication Data
US 2018/0249648 A1    Sep. 6, 2018

(30) Foreign Application Priority Data
Nov. 28, 2015    (CN) .......................... 2015 1 0850162

(51) Int. Cl.
*A01G 25/16* (2006.01)
*G05B 13/04* (2006.01)

(52) U.S. Cl.
CPC .......... *A01G 25/16* (2013.01); *A01G 25/167* (2013.01); *G05B 13/042* (2013.01)

(58) Field of Classification Search
CPC ..... A01G 25/16; A01G 25/167; G05B 13/042
See application file for complete search history.

(56) References Cited

U.S. PATENT DOCUMENTS

| 4,522,534 | A | 6/1985 | Wakamori et al. |
| 8,915,131 | B2 * | 12/2014 | Aughton ............. A01G 25/167 |
| | | | 73/152.01 |
| 8,985,899 | B2 * | 3/2015 | McIntyre .................. E02B 3/00 |
| | | | 405/80 |
| 10,028,425 | B2 * | 7/2018 | Canyon ................ A01B 79/005 |
| 10,132,625 | B2 * | 11/2018 | Zhang ..................... G01B 21/30 |
| 2016/0255763 | A1 * | 9/2016 | Canyon ................ A01B 79/005 |
| 2018/0038688 | A1 * | 2/2018 | Zhang ..................... G01B 21/30 |

FOREIGN PATENT DOCUMENTS

| CN | 102478493 A | 5/2012 |
| CN | 104677801 A | 6/2015 |
| CN | 105353620 A | 2/2016 |
| WO | WO 2015033269 A1 | 3/2015 |

OTHER PUBLICATIONS

International Search Report and Written Opinion dated Aug. 31, 2016 from PCT/CN2016/076969.

* cited by examiner

*Primary Examiner* — Abdelmoniem I Elamin
(74) *Attorney, Agent, or Firm* — Fay Sharpe LLP

(57) ABSTRACT

A method for controlling surface irrigation comprising: measuring in real time surface water depths and water stream advancing durations of each of measuring points in a first half of a target farmland block, and substituting them into a surface irrigation model, to obtain initial values of soil infiltration parameters, substituting the initial values into the surface irrigation model, to obtain analog values of surface water depths of each of measuring points having water before a preset measuring point when the water stream in the first half of the target farmland block has advanced to the preset measuring point, by using the objective function that average value of the errors of the measured values that are corresponding to it is minimum, reversely solving and optimizing the soil infiltration parameters, and substituting optimized soil infiltration parameters again into the surface irrigation model, and adjusting an irrigation duration according to the prediction result.

9 Claims, No Drawings

METHOD FOR CONTROLLING SURFACE IRRIGATION BASED ON SURFACE WATER DEPTH INFORMATION

This application is a 371 of PCT Patent Application Serial No. PCT/CN2016/076969, filed Mar. 22, 2016, which claims priority to Chinese Patent Application Serial No. 201510850162.9, filed Nov. 28, 2015.

The present application claims the priority of the Chinese patent application that was filed with the Patent Office of the People's Republic of China on Nov. 28, 2015 with the application number of 201510850162.9 and the title of invention of "a method for controlling surface irrigation based on surface water depth information", which is incorporated by reference into the present application in its entirety.

TECHNICAL FIELD

The present invention relates to the technical field of irrigation, and particularly to a method for controlling surface irrigation based on surface water depth information.

BACKGROUND ART

In the process of agricultural land irrigation, in order to improve the watering quality of surface irrigation and the level of controlling and managing surface irrigation, the surface irrigation is generally controlled in real time. Generally, to control surface irrigation, one manner is to rely on empirical data to control the border inflow rate or the irrigation duration.

However, it is well known that, surface irrigation cannot be accurately controlled by merely relying on empirical data.

SUMMARY OF THE INVENTION

The technical problem that the embodiments of the present invention seek to solve is to provide a method for controlling surface irrigation based on surface water depth information that can accurately control surface irrigation process. The particular technical solution is as follows:

A method for controlling surface irrigation based on surface water depth information, comprising:

Step a. measuring in real time surface water depths and water stream advancing durations of each of measuring points in a first half of a target farmland block, Step b. substituting the surface water depths and the water stream advancing durations into a surface irrigation model, to obtain initial values of soil infiltration parameters, substituting in turn the initial values of the soil infiltration parameters into the surface irrigation model, to obtain analogue values of surface water depths of each of measuring points having water before a preset measuring point when the water stream in the first half of the target farmland block has advanced to the preset measuring point, by using the objective function that an average value of errors between measured values of the surface water depths of each of the measuring points having water before the preset measuring point and the analogue values of the surface water depths of each of the measuring points having water before the preset measuring point when the water stream in the first half of the target farmland block has advanced to the preset measuring point is minimum, establishing a soil infiltration parameter solving model, and reversely solving and optimizing the soil infiltration parameters, and Step c. substituting the soil infiltration parameters that are obtained by the reversely solving and optimizing into the surface irrigation model, to predict a complete process of the surface irrigation, and adjusting an irrigation duration according to the prediction result, thereby realizing accurately controlling on the surface irrigation process, wherein a calculating formula of the surface irrigation model is shown as follows:

$$\frac{\partial h}{\partial t} + \frac{\partial Q}{\partial x} = -i_c$$

$$\frac{\partial Q}{\partial t} + \frac{\partial}{\partial x}\left(QU + \frac{gh^2}{2}\right) = -gh\frac{\partial b}{\partial x} - \frac{gn^2 U |U|}{h^{4/3}} + \frac{1}{2}Ui_c$$

wherein, x is a horizontal coordinate in the horizontal direction of an already known target farmland block, in units of m, t is a water stream advancing duration in the first half of the target farmland block that is actually measured, in units of s, h is a surface water depth in the first half of the target farmland block that is actually measured, in units of m, Q is a discharge per unit width of the water stream in the x-direction that is actually measured, in units of $m^3/(s \cdot m)$, U is an average flow velocity of a water stream in the direction perpendicular to the x-direction that is actually measured, in units of m/s, b is a land surface elevation of the already known target farmland block, in units of m, n is a Manning roughness coefficient, with an empirical value of 0.08-0.12, in units of $m/s^{1/3}$, g is the gravitational acceleration, in units of $m/s^2$, and $i_c$ is a surface water infiltration rate, in units of $m^3/(s \cdot m^2)$, wherein, $i_c = k\alpha t^{\alpha-1}$, and k and a are both the soil infiltration parameters.

Particularly, preferably, in the process of the reversely solving and optimizing the soil infiltration parameters, a calculating formula of the objective function is shown as follows:

$$y = \frac{1}{n}\left(\sum\nolimits_{j=1}^{n}\sum\nolimits_{i=1}^{n}\frac{|h_{ij}^0 - h_{ij}^s|}{h_{ij}^0}\right)$$

wherein, j is a number of the measuring point that the water stream has advanced to, i is a number of the measuring points before the j measuring point, $h_{ij}^0$ is a measured value of the surface water depth at the point i when the water stream has advanced to the point j, and $h_{ij}^s$ is an analogue value of the surface water depth at the point i when the water stream has advanced to the point j.

Preferably, the average value of errors is less than 10%.

Preferably, the average value of errors is less than 5%.

Particularly, preferably, the Step c specially comprises: substituting the soil infiltration parameters that are obtained by the reversely solving and optimizing into the surface irrigation model, predicting and adjusting the irrigation duration, and when within the irrigation duration, an average value of irrigation efficiencies and water distribution uniformities of the target farmland block is greater than 0.75 and a water storage efficiency is greater than 0.95, using the predicted irrigation duration as the actual irrigation duration, thereby realizing accurately controlling on the surface irrigation, wherein a calculating formula of the irrigation efficiency is shown as follows:

$$E_a = \frac{Z_s}{Z_{avg}}$$

a calculating formula of the water distribution uniformity is shown as follows:

$$CU = 1 - \frac{\sum_{i=1}^{n} |Z_i - Z_{avg}|}{n \cdot Z_{avg}}$$

and a calculating formula of the water storage efficiency is shown as follows:

$$E_s = \frac{Z_s}{Z_{req}}$$

wherein, $$Z_{avg} = \frac{\sum_{i=1}^{n} kt^\alpha}{n},$$

and is an average watering depth, in units of m, and $$Z_s = \frac{\sum_{i=1}^{n} Z_{avg}}{n},$$

and is an average water depth that is stored at a region of crop root after the irrigating, in units of m, and when the $Z_{avg}$ is ≥0.08 m, the $Z_{avg}$ is taken as 0.08 m, and when the $Z_{avg}$ is <0.08 m, the actual $Z_{avg}$ value is taken, wherein, $Z_i$ is a watering depth at the ith node, and $Z_i = kt^\alpha$, n is a number of nodes of the target farmland block, and $Z_{req}$ is a water demand of the crop irrigating, with an empirical value of 0.08 m.

The advantageous effects of the technical solutions that are provided by the embodiments of the present invention are:

The method for controlling surface irrigation based on surface water depth information that is provided by the embodiments of the present invention, by introducing the surface water depth information and the water stream advancing duration in the first half of the target farmland block into the calculating process of soil infiltration parameters, can effectively improve the calculation accuracy of soil infiltration parameters. On the basis of that, the present invention, by substituting the obtained soil infiltration parameters into the surface irrigation model to obtain the analogue values of the surface water depths of each of the measuring points, and by using the objective function that the average value of the errors between the analogue values and the measured values of the surface water depths of each of the measuring points is minimum, optimizes and reversely solves the soil infiltration parameters, and in turn substitutes the soil infiltration parameters that are obtained by the reversely solving and optimizing into the surface irrigation model. Now, the established surface irrigation model can be used to accurately predict the irrigation process of the second half of the target farmland block, so as to adjust in real time the irrigation duration (that is, to adjust the time to close the water inlet of the farmland block), thereby realizing accurately controlling on the surface irrigation, to effectively improve the irrigation quality and promote the level of field management. Furthermore, the method can be easily implemented by merely establishing a mathematical model and inputting the surface water depths in the first half of the target farmland block that are actually measured into a computer, and it has simple operation and can be conveniently spread on a large scale.

DETAILED DESCRIPTION OF THE INVENTION

In order to make the objects, the technical solutions and the advantages of the present invention clearer, the embodiments of the present invention will be described below in further detail.

The embodiments of the present invention provide a method for controlling surface irrigation based on surface water depth information, wherein the method comprises the following steps:

Step 101. measuring in real time surface water depths and water stream advancing durations of each of measuring points in a first half of a target farmland block.

In that, the "surface water depths and water stream advancing durations of each of measuring points in a first half of a target farmland block" described herein refers to that, in the first half of the target farmland block, when the water stream has advanced to each of the measuring points therein, the advancing duration until the water stream has advanced to the special measuring point serves as the water stream advancing duration that is obtained by in real time measuring, and when the water stream has advanced to a downstream measuring point adjacent to the special measuring point, the surface water depths that are measured in real time at the special measuring point serves as the desired surface water depths.

Step 102. substituting the surface water depths and the water stream advancing durations into a surface irrigation model, to obtain initial values of soil infiltration parameters by trial calculation, substituting in turn the initial values of the soil infiltration parameters into the surface irrigation model, to obtain analogue values of surface water depths of each of measuring points having water before a preset measuring point when the water stream in the first half of the target farmland block has advanced to the preset measuring point, and by using the objective function that an average value of errors between measured values of the surface water depths of each of the measuring points having water before the preset measuring point and the analogue values of the surface water depths of each of the measuring points having water before the preset measuring point when the water stream in the first half of the target farmland block has advanced to the preset measuring point is minimum, establishing a soil infiltration parameter solving model, and reversely solving and optimizing the soil infiltration parameters.

The "each of measuring points having water before a preset measuring point" described herein refers to each of the measuring points that are in the upstream of the preset measuring point and covered by water. For example, when the water stream has advanced to the 50 m measuring point, and the measuring points that are in the upstream of the 50 m measuring point, such as the 10 m measuring point, the 20 m measuring point, the 30 m measuring point and the 40 m measuring point, are all covered by water, now the analogue values and the measured values of the surface water depths of the 10 m measuring point, the 20 m measuring point, the 30 m measuring point and the 40 m measuring point can be obtained.

Step 103. substituting the soil infiltration parameters that are obtained by the reversely solving and optimizing into the surface irrigation model, to predict a complete process of the surface irrigation, and adjusting an irrigation duration according to the prediction result, thereby realizing accurately controlling on the surface irrigation process, wherein a calculating formula of the surface irrigation model is shown as follows:

$$\frac{\partial h}{\partial t} + \frac{\partial Q}{\partial x} = -i_c$$

$$\frac{\partial Q}{\partial t} + \frac{\partial}{\partial x}\left(QU + \frac{gh^2}{2}\right) = -gh\frac{\partial b}{\partial x} - \frac{gn^2 U |U|}{h^{4/3}} + \frac{1}{2}Ui_c$$

wherein, x is a horizontal coordinate in the horizontal direction of an already known target farmland block, in units of m, t is a water stream advancing duration in the first half of the target farmland block that is actually measured, in units of s, h is a surface water depth in the first half of the target farmland block that is actually measured, in units of m, Q is a discharge per unit width of the water stream in the x-direction that is actually measured, in units of m$^3$/(s·m), U is an average flow velocity of a water stream in the direction perpendicular to the x-direction that is actually measured, in units of m/s, b is a land surface elevation of the already known target farmland block, in units of m, n is a Manning roughness coefficient, with an empirical value of 0.08-0.12, in units of m/s$^{13}$, g is the gravitational acceleration, in units of m/s$^2$, and $i_c$ is a surface water infiltration rate, in units of m$^3$/(s·m$^2$), wherein, $i_c$=k$\alpha t^{\alpha-1}$, and k and a are both the soil infiltration parameters, that is, the KostiaCOV soil infiltration parameters.

The method for controlling surface irrigation based on surface water depth information that is provided by the embodiments of the present invention, by introducing the surface water depth information and the water stream advancing duration in the first half of the target farmland block into the calculating process of soil infiltration parameters, can effectively improve the calculation accuracy of soil infiltration parameters. On the basis of that, the present invention, by substituting the obtained soil infiltration parameters into the surface irrigation model to obtain the analogue values of the surface water depths of each of the measuring points, and by using the objective function that the average value of the errors between the analogue values and the measured values of the surface water depths of each of the measuring points is minimum, optimizes and reversely solves the soil infiltration parameters, and in turn substitutes the soil infiltration parameters that are obtained by the reversely solving and optimizing into the surface irrigation model. Now, the established surface irrigation model can be used to accurately predict the irrigation process of the second half of the target farmland block, so as to adjust in real time the irrigation duration (that is, to adjust the time to close the water inlet of the farmland block), thereby realizing accurately controlling on the surface irrigation, to effectively improve the irrigation quality and promote the level of field management. Furthermore, the method can be easily implemented by merely establishing a mathematical model and inputting the surface water depths in the first half of the target farmland block that are actually measured into a computer, and it has simple operation and can be conveniently spreaded on a large scale. A person skilled in the art can understand that, the controlling on the surface irrigation process can be realized by controlling the border inflow rate or the irrigation duration, and because in most cases, the border inflow rate is constant, in the embodiments of the present invention, the accurate control on the surface irrigation process is realized by adjusting in real time the irrigation duration.

Herein, the "the first half of the target farmland block" described above refers to: the area that is from the starting point of the target farmland block to the ⅖-⅘, preferably ⅗, of the length of the target farmland block. For example, if the length of the target farmland block is 100 m and the width 2 m, then the first half of the target farmland block refers to the area between the starting point of the target farmland block and the position of the length 40 m-80 m, and preferably the area between the starting point of the target farmland block and the position of the length 60 m. The Manning roughness coefficient described above may take the empirical value of 0.08-0.12, such as 0.08, 0.09, 0.10, 0.11 and 0.12, and the empirical value may be particularly determined according to the situations of the farmland block and the crop.

Particularly, the water stream advancing duration in the first half of the target farmland block and the surface water depths in the first half of the target farmland block may be measured in real time by artificial measurement or by using a water level and water stream information monitoring device, preferably by using the water level and water stream information monitoring device, to improve the accuracy.

In order to improve the accuracy of the calculation result of the soil infiltration parameters of the target farmland block, the embodiments of the present invention, in the process of reversely solving and optimizing the soil infiltration parameters, use the objective function that the average value of the errors between the measured values of the surface water depths of each of the measuring points in the first half and the analogue values that are obtained by the surface irrigation model is minimum, and determine the optimized soil infiltration parameters according to the objective function. In that, the average value of the errors should be less than 10%, such as less than 8%, less than 6%, preferably less than 5%, and more preferably less than 3%, and it can be understood that, the average relative error should be as small as possible.

Particularly, a calculating formula of the objective function is shown as follows:

$$y = \frac{1}{N}\left(\sum_{j=1}^{n}\sum_{i=1}^{n}\frac{|h_{ij}^0 - h_{ij}^s|}{h_{ij}^0}\right)$$

wherein, j is a number of the measuring point that the water stream has advanced to, i is a number of the measuring points before the j measuring point, $h_{ij}^0$ is a measured value of the surface water depth at the point i when the water stream has advanced to the point j, and $h_{ij}^s$ is an analogue value of the surface water depth at the point i when the water stream has advanced to the point j.

In that, that i is a number of the measuring points before the j measuring point, refers to the number of the measuring points that are in the upstream of the j measuring point.

For example, the present invention, in the process of reversely solving and optimizing the soil infiltration parameters k value and a value by using the objective function, firstly, when the water stream reaches the final measuring point in the first half, substituting the surface water depths and the water stream advancing durations of each of the measuring points that are measured into the surface irrigation model, whereby a group of initial values of the soil infiltration parameters k and α can be obtained, and substituting the initial values of k and a into the surface irrigation model, to obtain the analogue values of the surface water depths of each of the measuring points having water before the measuring points when the water stream in the first half of the target farmland block has advanced to each of the measuring points, by using the objective function that the average value of the errors between the measured values and the analogue values of the surface water depths of each of the measuring points having water before the measuring points when the water stream in the first half of the target farmland block has advanced to each of the measuring points is minimum, establishing a soil infiltration parameter solving model, and repeatedly adjusting the k value and the a value, and when the relative error is less than 10% or better, determining the k value and the a value at the moment to be the "soil infiltration parameters that are obtained by the reversely solving and optimizing" that is described above.

Further, the field soil water distribution that is ideal for surface irrigation is that the watering depths at all the points in the field are all equal to the designed irrigation depth, that is, the irrigating water stream evenly covers the whole target farmland block. The virtues or defects degree of surface irrigation quality are generally evaluated by using irrigation performance evaluation indicators, wherein the commonly employed irrigation performance evaluation indicators include irrigation efficiency, water distribution uniformity and water storage efficiency. On the basis of that, in the embodiments of the present invention, Step 103 specially comprises: substituting the soil infiltration parameters that are obtained by the reversely solving and optimizing into the surface irrigation model, predicting and adjusting the irrigation duration, and when within the determined irrigation duration, an average value of irrigation efficiencies and water distribution uniformities of the target farmland block is greater than 0.75 and a water storage efficiency is greater than 0.95, using the predicted irrigation duration as the actual irrigation duration, thereby realizing accurately controlling on the surface irrigation.

More particularly, a calculating formula of the irrigation efficiency is shown as follows:

$$E_a = \frac{Z_s}{Z_{avg}}$$

a calculating formula of the water distribution uniformity is shown as follows:

$$CU = 1 - \frac{\sum_{i=1}^{n} |Z_i - Z_{avg}|}{n \cdot Z_{avg}}$$

and a calculating formula of the water storage efficiency is shown as follows:

$$E_s = \frac{Z_s}{Z_{req}}$$

wherein, $$Z_{avg} = \frac{\sum_{i=1}^{n} kt^\alpha}{n},$$

and is an average watering depth, in units of m, and $$Z_s = \frac{\sum_{i=1}^{n} Z_{avg}}{n},$$

and is an average water depth that is stored at a region of crop root after the irrigating, in units of m, and when the $Z_{avg}$ is ≥0.08 m, the $Z_{avg}$ is taken as 0.08 m, and when the $Z_{avg}$ is <0.08 m, the actual $Z_{avg}$ value is taken, wherein, $Z_i$ is a watering depth at the ith node, and $Z_i = kt^\alpha$, n is a number of nodes of the target farmland block, and $Z_{req}$ is a water demand of the crop irrigating, with an empirical value of 0.08 m.

The present invention will be in detail described below by referring to the special examples:

Example 1

This Example employs a suburban area near Beijing as the application region of the present invention, and chooses 4 target farmland blocks of 100 m×2 m, which are marked as q1, q2, q3 and q4. The crop that be planted is winter wheat. The 4 farmland blocks are arranged in parallel to conduct the irrigation test, and their discharge per unit widths, irrigation water demands and roughness coefficients are all the same, which are 5.6 L/s, 2 cm and 0.08 respectively. In that, the farmland blocks q1 and q2 employ the method that is provided by the present invention to accurately control the surface irrigation process, and measure in real time the terrain data, and the surface water depths and the water stream advancing durations of each of the measuring points in the first halves of the target farmland blocks. The farmland blocks q3 and q4 employ the conventional surface irrigation method, which relies on experience, that is, closing the water inlet when the water stream has advanced to the field tail.

It can be understood that, this Example can conduct the following operations by using a system for controlling the surface irrigation, to improve the accuracy and operability of the surface irrigation. The system requires platform support from software and hardware, wherein, the hardware support comprises a computer, a water level and water stream information pressure sensor, an information receiver and an information manager, which are in serial electrically connected. In that, the water level and water stream information pressure sensor is provided in the target farmland blocks, and is used to monitor in real time the information about the variation of the irrigation levels and water streams of the target farmland blocks, that is, the surface water depths and the water stream advancing durations in the first halves of the target farmland blocks, then transmit the gathered information to the information receiver by wireless transmission, then transmit to the information manager to store, and transmit to the computer. The computer, on the basis of the surface irrigation model, by using the objective function that the average relative error between the measured values and the analogue values of the surface water depths and the water stream advancing durations is minimum, reversely solves and optimizes the soil infiltration parameters. Furthermore, the computer is further connected to electromagnetic valves that are provided at the starting points of the target farmland blocks, to control the irrigation flow rates and the irrigation durations.

The particular steps of this Example are as follows:

1. Monitoring in real time the surface water depths and the advancing durations

In this Example, the farmland blocks q1 and q2 employ the method of Step 101, to measure in real time the surface water depths and the water stream advancing durations of each of the measuring points in the first halves of the target farmland blocks.

2. Calculating the soil infiltration parameters

In this Example, the farmland blocks q1 and q2 employ the method of Step 102, to, in one irrigation process, with the water level and water stream information at the 60% points in the direction of the lengths of the farmland blocks, optimize and reversely solve the soil infiltration parameters, to obtain the results shown in Table 1.

TABLE 1

| Soil infiltration parameters | | |
|---|---|---|
| | Farmland Block q1 | Farmland Block q2 |
| $k$ (mm/$h^a$) | 114.37 | 109.34 |
| $a$ | 0.51 | 0.47 |

3. Predicting the complete irrigation process, calculating the irrigation performance parameters, and studying and choosing an accurate irrigation solution In this Example, the farmland blocks q1 and q2 employ the method of Step 103, to obtain the results of the irrigation efficiencies $E_a$, the water distribution uniformities CU and the water storage efficiencies $E_s$, which are shown in Table 2.

Comparative Example

In order to verify the accuracy of the method of the present invention, the irrigation efficiencies, the water distribution uniformities and the water storage efficiencies of the farmland blocks q3 and q4 are obtained by using the conventional irrigation method, and the irrigation performance parameters of the method of the present invention and the conventional method are compared.

TABLE 2

| Comparsaion Table of Irrigation Performance Parameters | | | | |
|---|---|---|---|---|
| | Farmland Block q1 | Farmland Block q2 | Farmland Block q3 | Farmland Block q4 |
| $E_a$ | 0.765 | 0.718 | 0.795 | 0.786 |
| CU | 0.822 | 0.794 | 0.634 | 0.659 |
| $E_s$ | 1 | 1 | 1 | 1 |

The experimental result indicates that, by accurately controlling the surface irrigation by using the method that is provided by the embodiments of the present invention, the average values of the irrigation efficiencies and the water distribution uniformities of each of the target farmland blocks are all greater than 0.75, and the water storage efficiencies are greater than 0.95. However, if the conventional surface irrigation method is employed, that is, closing the water inlet when the irrigating water stream has advanced to the field tail, the result is that, although the water storage efficiencies are greater than 0.95, the average values of the irrigation efficiencies and the water distribution uniformities are both less than 0.75. It can be seen that, the method that is provided by the embodiments of the present invention can achieve the purpose of accurately controlling surface irrigation and improving watering quality.

The above descriptions are merely preferable embodiments of the present invention, and are not limiting the protection scope of the present invention. Any modifications, equivalent substitutions or improvements that are made within the spirit and principle of the present invention should all be included in the protection scope of the present invention.

The invention claimed is:

1. A method for controlling surface irrigation based on surface water depth information, comprising:

Step a. measuring, by a water level and water stream information pressure sensor provided in target farmland blocks, in real time, surface water depths and water stream advancing durations of each of measuring points in a first half of a target farmland block, and transmitting the surface water depths and water stream advancing durations to a computer, Step b. substituting, by a processor of the computer, the surface water depths and the water stream advancing durations into a surface irrigation model stored in a memory of the computer, to obtain initial values of soil infiltration parameters, substituting, by the processor of the computer, in turn the initial values of the soil infiltration parameters into the surface irrigation model, to obtain, by the processor of the computer, analogue values of surface water depths of each of measuring points having water before a preset measuring point when the water stream in the first half of the target farmland block has advanced to the preset measuring point, by using an objective function that an average value of errors between measured values of the surface water depths of each of the measuring points having water before the preset measuring point and the analogue values of the surface water depths of each of the measuring points having water before the preset measuring point when the water stream in the first half of the target farmland block has advanced to the preset measuring point is minimum, establishing, by the processor of the computer, a soil infiltration parameter solving model, and reversely solving and optimizing the soil infiltration parameters, and Step c. substituting, by the processor of the computer, the soil infiltration parameters that are obtained by the reversely solving and optimizing into the surface irrigation model stored in the memory of the computer, to predict, by the processor of the computer, a complete process of the surface irrigation, and adjusting, by the processor of the computer, an irrigation duration according to the prediction result, thereby realizing accurate control of the surface irrigation process, wherein a calculating formula of the surface irrigation model stored in the memory of the computer is shown as follows:

$$\frac{\partial h}{\partial t} + \frac{\partial Q}{\partial x} = -i_c$$

$$\frac{\partial Q}{\partial t} + \frac{\partial}{\partial x}\left(QU + \frac{gh^2}{2}\right) = -gh\frac{\partial b}{\partial x} - \frac{gn^2 U|U|}{h^{4/3}} + \frac{1}{2}Ui_c$$

wherein, x is a horizontal coordinate in the horizontal direction of an already known target farmland block, in units of m, t is a water stream advancing duration in the first half of the target farmland block that is actually measured, in units of s, h is a surface water depth in the first half of the target farmland block that is actually measured, in units of m, Q is a discharge per unit width of the water stream in the x-direction that is actually measured, in units of m$^3$/(s·m), U is an average flow velocity of a water stream in the direction perpendicular to the x-direction that is actually measured, in units of m/s, b is a land surface elevation of the already known target farmland block, in units of m, n is a Manning roughness coefficient, with an empirical value of 0.08-0.12, in units of m/s$^{1/3}$, g is the gravitational acceleration, in units of m/s$^2$, and $i_c$ is a surface water infiltration rate, in units of m$^3$/(s·m$^2$), wherein, $i_c$=k$\alpha$t$^{\alpha-1}$, and k and $\alpha$ are both the soil infiltration parameters.

2. The method according to claim 1, wherein, in the process of the reversely solving and optimizing the soil infiltration parameters, a calculating formula of the objective function stored in the memory of the computer is shown as follows:

$$y = \frac{1}{N}\left(\sum_{j=1}^{n}\sum_{i=1}^{n}\frac{|h_{ij}^0 - h_{ij}^s|}{h_{ij}^0}\right)$$

wherein, j is a number of the measuring point that the water stream has advanced to, i is a number of the measuring points before the j measuring point, $h_{ij}^0$ is a measured value of the surface water depth at the point i when the water stream has advanced to the point j, and $h_{ij}^s$ is an analogue value of the surface water depth at the point i when the water stream has advanced to the point j.

3. The method according to claim 1, wherein, the average value of errors is less than 10%.

4. The method according to claim 3, wherein, the average value of errors is less than 5%.

5. The method according to claim 1, wherein, the Step c specially comprises: substituting, by the processor of the computer, the soil infiltration parameters that are obtained by the reversely solving and optimizing into the surface irrigation model, predicting and adjusting, by the processor of the computer, the irrigation duration, and when within the irrigation duration, an average value of irrigation efficiencies and water distribution uniformities of the target farmland block is greater than 0.75 and a water storage efficiency is greater than 0.95, using the predicted irrigation duration as the actual irrigation duration, thereby realizing accurate control of the surface irrigation,
wherein a calculating formula of the irrigation efficiency stored in the memory of the computer is shown as follows:

$$E_a = \frac{Z_s}{Z_{avg}}$$

a calculating formula of the water distribution uniformity stored in the memory of the computer is shown as follows:

$$CU = 1 - \frac{\sum_{i=1}^{n}|Z_i - Z_{avg}|}{n \cdot Z_{avg}}$$

and a calculating formula of the water storage efficiency stored in the memory of the computer is shown as follows:

$$E_s = \frac{Z_s}{Z_{req}}$$

wherein, $$Z_{avg} = \frac{\sum_{i=1}^{n} kt^\alpha}{n},$$

and is an average watering depth, in units of m, and $$Z_s = \frac{\sum_{i=1}^{n} Z_{avg}}{n},$$

and is an average water depth that is stored at a region of crop root after the irrigating, in units of m, and when the $Z_{avg}$ is ≥0.08 m, the $Z_{avg}$ is taken as 0.08 m, and when the $Z_{avg}$ is <0.08 m, the actual $Z_{avg}$ value is taken, wherein, $Z_i$ is a watering depth at the ith node, and $Z_i$=kt$^\alpha$, n is a number of nodes of the target farmland block, and $Z_{req}$ is a water demand of the crop irrigating, with an empirical value of 0.08 m.

6. The method according to claim 2, wherein, the Step c specially comprises: substituting, by the processor of the computer, the soil infiltration parameters that are obtained by the reversely solving and optimizing into the surface irrigation model, predicting and adjusting, by the processor of the computer, the irrigation duration, and when within the irrigation duration, an average value of irrigation efficiencies and water distribution uniformities of the target farmland block is greater than 0.75 and a water storage efficiency is greater than 0.95, using the predicted irrigation duration as the actual irrigation duration, thereby realizing accurate control of the surface irrigation,
wherein a calculating formula of the irrigation efficiency stored in the memory of the computer is shown as follows:

$$E_a = \frac{Z_s}{Z_{avg}}$$

a calculating formula of the water distribution uniformity stored in the memory of the computer is shown as follows:

$$CU = 1 - \frac{\sum_{i=1}^{n} |Z_i - Z_{avg}|}{n \cdot Z_{avg}}$$

and a calculating formula of the water storage efficiency stored in the memory of the computer is shown as follows:

$$E_s = \frac{Z_s}{Z_{req}}$$

wherein, $$Z_{avg} = \frac{\sum_{i=1}^{n} kt^\alpha}{n},$$

and is an average watering depth, in units of m, and $$Z_s = \frac{\sum_{i=1}^{n} Z_{avg}}{n},$$

and is an average water depth that is stored at a region of crop root after the irrigating, in units of m, and when the $Z_{avg}$ is ≥0.08 m, the $Z_{avg}$ is taken as 0.08 m, and when the $Z_{avg}$ is <0.08 m, the actual $Z_{avg}$ value is taken, wherein, $Z_i$ is a watering depth at the ith node, and $Z_i = kt^\alpha$, n is a number of nodes of the target farmland block, and $Z_{req}$ is a water demand of the crop irrigating, with an empirical value of 0.08 m.

7. The method according to claim 3, wherein, the Step c specially comprises: substituting, by the processor of the computer, the soil infiltration parameters that are obtained by the reversely solving and optimizing into the surface irrigation model, predicting and adjusting, by the processor of the computer, the irrigation duration, and when within the irrigation duration, an average value of irrigation efficiencies and water distribution uniformities of the target farmland block is greater than 0.75 and a water storage efficiency is greater than 0.95, using the predicted irrigation duration as the actual irrigation duration, thereby realizing accurate control of the surface irrigation, wherein a calculating formula of the irrigation efficiency stored in the memory of the computer is shown as follows:

$$E_a = \frac{Z_s}{Z_{avg}}$$

a calculating formula of the water distribution uniformity stored in the memory of the computer is shown as follows:

$$CU = 1 - \frac{\sum_{i=1}^{n} |Z_i - Z_{avg}|}{n \cdot Z_{avg}}$$

and a calculating formula of the water storage efficiency stored in the memory of the computer is shown as follows:

$$E_s = \frac{Z_s}{Z_{req}}$$

wherein, $$Z_{avg} = \frac{\sum_{i=1}^{n} kt^\alpha}{n},$$

and is an average watering depth, in units of m, and $$Z_s = \frac{\sum_{i=1}^{n} Z_{avg}}{n},$$

and is an average water depth that is stored at a region of crop root after the irrigating, in units of m, and when the $Z_{avg}$ is ≥0.08 m, the $Z_{avg}$ is taken as 0.08 m, and when the $Z_{avg}$ is <0.08 m, the actual $Z_{avg}$ value is taken, wherein, $Z_i$ is a watering depth at the ith node, and $Z_i = kt^\alpha$, n is a number of nodes of the target farmland block, and $Z_{req}$ is a water demand of the crop irrigating, with an empirical value of 0.08 m.

8. The method according to claim 4, wherein, the Step c specially comprises: substituting, by the processor of the computer, the soil infiltration parameters that are obtained by the reversely solving and optimizing into the surface irrigation model, predicting and adjusting, by the processor of the computer, the irrigation duration, and when within the irrigation duration, an average value of irrigation efficiencies and water distribution uniformities of the target farmland block is greater than 0.75 and a water storage efficiency is greater than 0.95, using the predicted irrigation duration as the actual irrigation duration, thereby realizing accurate control of the surface irrigation, wherein a calculating formula of the irrigation efficiency stored in the memory of the computer is shown as follows:

$$E_a = \frac{Z_s}{Z_{avg}}$$

a calculating formula of the water distribution uniformity stored in the memory of the computer is shown as follows:

$$CU = 1 - \frac{\sum_{i=1}^{n} |Z_i - Z_{avg}|}{n \cdot Z_{avg}}$$

and a calculating formula of the water storage efficiency stored in the memory of the computer is shown as follows:

$$E_s = \frac{Z_s}{Z_{req}}$$

wherein, $$Z_{avg} = \frac{\sum_{i=1}^{n} kt^{\alpha}}{n},$$

and is an average watering depth, in units of m, and $$Z_s = \frac{\sum_{i=1}^{n} Z_{avg}}{n},$$

and is an average water depth that is stored at a region of crop root after the irrigating, in units of m, and when the $Z_{avg}$ is ≥0.08 m, the $Z_{avg}$ is taken as 0.08 m, and when the $Z_{avg}$ is <0.08 m, the actual $Z_{avg}$ value is taken, wherein, $Z_i$ is a watering depth at the ith node, and $Z_i = kt^{\alpha}$, n is a number of nodes of the target farmland block, and $Z_{req}$ is a water demand of the crop irrigating, with an empirical value of 0.08 m.

9. The method according to claim 1, wherein the realized accurate control of the surface irrigation process occurs by controlling electromagnetic valves to control an irrigation flow rate.

\* \* \* \* \*